July 17, 1962 A. A. NISHIHAMA 3,044,091
TOOL ATTACHING MEANS FOR CIRCULAR RUBBING MACHINES
Filed April 22, 1960
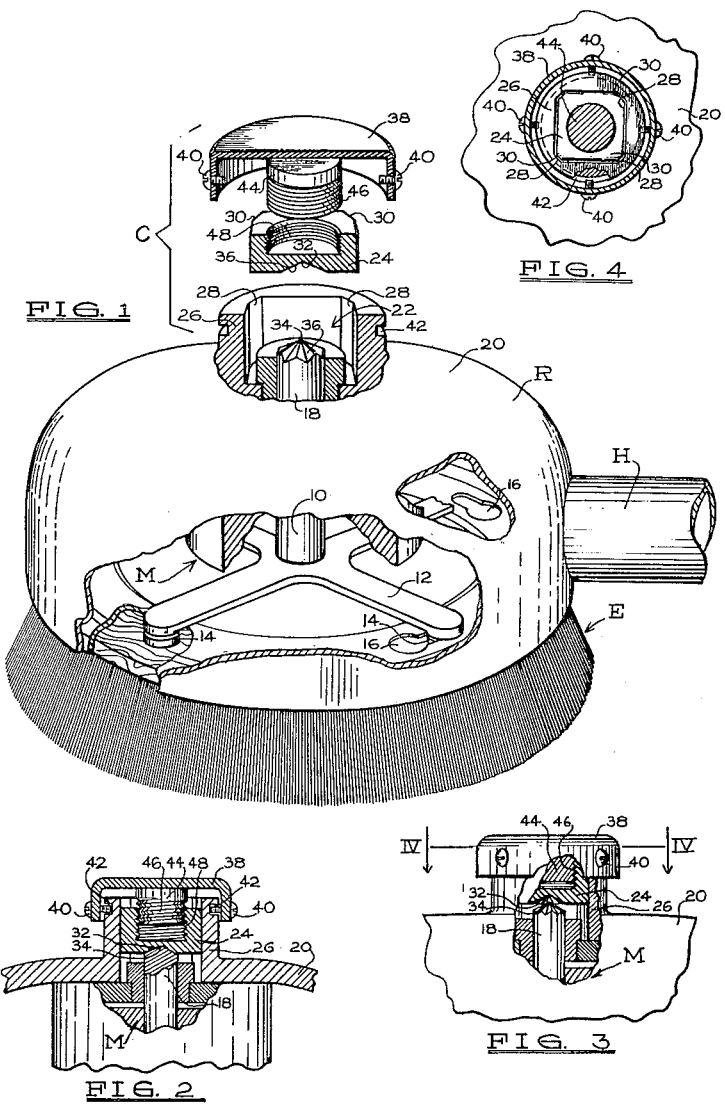
INVENTOR:
A. A. NISHIHAMA
BY:
Leon Arthurs
AGENT ём
United States Patent Office 3,044,091
Patented July 17, 1962

3,044,091
TOOL ATTACHING MEANS FOR CIRCULAR RUBBING MACHINES
Archie Akira Nishihama, 67 Rose Ave., Toronto, Ontario, Canada
Filed Apr. 22, 1960, Ser. No. 23,992
4 Claims. (Cl. 15—49)

The invention relates to improvements in rubbing machines, and is of particular application in connection with, for example, a floor polishing machine, having removable rubbing elements.

In many such cases the attachment of a rubbing element or elements to such a machine is effected by means of interlock facilities, sometimes in the form of studs extending from the driver element of such machine, and interlockable with recesses provided in the rubbing element for the purpose, this being but one illustration of the many types of interlock facilities in fact in use. In order to engage or disengage a rubbing element from such a machine a twisting motion is often necessary, which motion obviously tends to rotate or move the driver of such machine, which, in turn, being free to move, frequently causes more or less difficulty in the engagement or disengagement of the rubbing element.

Accordingly, it is a principal objective of the invention to provide an improved rubbing machine wherein the engagement and disengagement of rubbing elements thereon is facilitated.

More specifically, it is an objective of the invention to provide a rubbing machine having the aforementioned advantages and having means for gripping the driver element of such rubbing machine against rotation during engagement and disengagement.

Still more specifically, it is an object of the invention to provide a rubbing machine having the aforementioned advantages in which the means for gripping the driver element thereof as aforesaid is manipulable externally of the rubbing machine.

Further and related objectives of the invention are the provision of, for example, a rubbing machine having the foregoing advantages and of contemporary appearance, free from obstructions, and the provision of such means for gripping the driver element which is relatively cheap and economical to make, and simple in operation.

The invention seeks to provide the foregoing and other advantages which will appear from the following description of a preferred embodiment thereof by the provision of a rubbing machine of the type described above, having a clutch manipulable externally thereof for temporarily restraining movement of the driver while the rubbing element is being connected therewith and disconnected therefrom.

A preferred embodiment of the invention will now be described with reference to the following drawings, in which, like reference devices refer to like parts thereof throughout the various views and diagrams, and in which;

FIG. 1 is a perspective view of a rubbing machine according to the invention, with the clutch thereof "exploded"; the clutch, and parts of the rubbing machine, being cut away to reveal the details thereof, FIG. 2 is a side elevational view of the upper part of a rubbing machine according to the invention, part thereof being sectioned to show the various parts of the clutch as assembled, and engaged with the driver, FIG. 3 is an elevational view corresponding to FIG. 2 showing the clutch disengaged, and FIG. 4 is a sectional plan view of the clutch mechanism shown in FIGURE 3 sectioned along the line IV—IV thereof.

The rubbing machine R, shown in FIGURE 1, will be seen to be of the type commonly used for polishing floors, having a rubbing element E and a handle H, by which the machine may be guided and controlled in operation.

The rubbing machine R in FIGURE 1 is cut away to reveal the driver 10 provided at its lower end with a quadrant 12 having studs 14 mounted at the extremities thereof for interlocking in slots 16 in the upper surface of the rubbing element E. Driver 10 is mounted for rotation freely in either direction in bearings (not shown) and is driven in one direction by any suitable motor M, for operation of rubbing element E. The particular rubbing machine R here illustrated is powered by an electric motor M, and in fact, in this preferred embodiment, driver 10 constitutes the spindle of the armature of such a motor, though these details are not shown in these illustrations for the sake of clarity.

At all events, the upper end 18 of driver 10, is exposed clear of such motor M rendering the same readily engageable by clutch C for restraining movement thereof. Driver 10 will be seen to be at least partially enclosed and contained by housing 20, which in this preferred embodiment, provides the exterior casing of the rubbing machine R. An opening 22 is formed in housing 20 along the axis of driver 10, for location of clutch C therein which will now be described in greater detail.

From FIGURE 1 it will be seen that clutch C is essentially a composite structure comprising the bit 24 slidably carried in the hollow guide member 26 fastened in opening 22 of housing 20 co-axially with driver 10. Guide member 26 is provided with flats 28 engaging corresponding flats 30 on bit 24 guiding the same and preventing rotation thereof. Bit 24 is further provided with a recessed mating formation 32 adapted to receive and fit around the corresponding conical mating formation 34 in the upper end 18 of driver 10. Mating formations 32 and 34 are provided with serrations 36 adapted to interengage with one another and positively restrain any tendency for driver 10 to rotate during engagement or disengagement of rubbing element E.

In order to slide bit 24 within guide member 26 towards and away from upper end 18 of driver 10 along the axis thereof, handle 38 is provided, located on the upper end of a guide member 26 externally of housing 20 and forming a cap for guide member 26, completing housing 20. Handle 38 is mounted for rotation in relation to guide member 26, by means of studs 40 extending through handle 38 and into annular groove 42 formed around the exterior of guide member 26 forming a track around which studs 40 may run while yet retaining handle 38 on guide member 26.

In order to transmit rotation of handle 38 to bit 24 as an up or down sliding movement thereof, shaft 44 is fastened to handle 38, and is threaded as at male threaded portion 46 for engaging the corresponding female threaded portion 48 of bit 24.

In operation, when it is desired, for example, to disengage rubbing element E from the rubbing machine R, handle 38 may be rotated so as to cause bit 24 to move downwardly within guideway 26, under the influence of threaded portion 46 of shaft 44 running in threaded portion 48. Such movement will cause mating formation 32 on bit 24 to fit around mating formation 34 on upper end 18 of driver 10, serrations 36 thereon interengaging with one another and positively restraining driver 10 against rotation, rotation of bit 24 being restrained by engagement of flats 30 thereon with flats 28 on the inside of guide member 26. It will be seen that such interengagement of mating formations 32 and 34 can, in fact, be effected in substantially any stationary position of driver 10 with little or no difficulty.

Rubbing element E can then be simply disengaged from studs 14 by merely rotating it in the appropriate direction by hand, in known manner, rotation of driver 10 being restrained as aforesaid, thus facilitating such disengagement particularly where studs 14 may have become firmly jammed in slots 16.

In the same manner a rubbing element E may be engaged, by simply interlocking studs 14 in slots 16 thereof with a reverse twisting movement, driver 10 being still restrained by the engagement of bit 24 with upper end 18 thereof, after which handle 38 may be rotated in the reverse direction to withdraw bit 24 causing mating formation 32 to move away from mating formation 34 on upper end 18 of driver 10, and retracting bit 24 upwardly within guide member 26, leaving driver 10 free for operation.

It will be noted that throughout these operations no part of driver 10 is unnecessarily exposed, handle 38 providing a cap over the end of guide member 26 and opening 22 of housing 20, and being otherwise relatively unobstrusive.

The foregoing description of a preferred embodiment of the invention is here made by way of example only, and it is not thought that the invention is limited to the specific construction illustrated other than as specified in the appended claims which are intended to include all modifications which do not depart from the spirit of the invention.

What I claim as my invention is:

1. A rubbing machine including a driver relatively freely rotatable when out of operation; a housing at least partially containing said driver; a rubbing element for operation by said driver; co-operating interlock facilities carried by said driver and said rubbing element for rotatably connecting them and disconnecting them from each other; a hollow guide on said housing providing access to said driver; a bit movable within said guide member for releasably engaging said driver and restraining it against rotation, and means manipulable externally of said housing for selectively moving said bit between and for maintaining it in driver engaging and driver releasing positions.

2. A rubbing machine as set forth in claim 1 wherein said driver and said bit are respectively provided with serrations which are adapted to mate with each other to restrain movement of the driver as aforesaid; means being provided for preventing rotation of said bit within said hollow guide.

3. A rubbing machine as set forth in claim 1 wherein the means for moving the said bit between driver engaging and driver releasing posiitons is constituted by a cap member secured for rotation about said hollow guide and screw threadedly engaging said bit in the interior thereof; means being provided for preventing rotation of said bit within said guide member.

4. A rubbing machine including a driver relatively freely rotatable when out of operation; a housing at least partially containing said driver; a rubbing element for operation by said driver; co-operating interlock facilities carried by said driver and said rubbing element for rotatably connecting them and disconnecting them from each other; a hollow guide member on said housing, said driver having an end co-axial with said hollow guide and accessible therethrough; a bit movable within said guide for releasably engaging the said driver end; means for preventing rotation of said bit within said guide; mating serrations carried by said bit and said driver end inter-engageable with each other to restrain the said driver against rotation, and a cap secured for rotation about said hollow guide screw-threadedly engaging said bit in the interior thereof for selectively moving said bit between and for maintaining it in driver engaging and driver releasing positions.

References Cited in the file of this patent

UNITED STATES PATENTS

| 1,391,882 | Dworniczak | Sept. 27, 1921 |
| 2,702,098 | Staak | Feb. 15, 1955 |